(12) United States Patent
Lee

(10) Patent No.: US 8,922,146 B2
(45) Date of Patent: Dec. 30, 2014

(54) APPARATUS FOR ESTIMATING ROTOR TIME CONSTANT OF INDUCTION MOTOR

(71) Applicant: LSIS Co., Ltd., Anyang-si, Gyeonggi-do (KR)

(72) Inventor: Sun Woo Lee, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 196 days.

(21) Appl. No.: 13/662,286

(22) Filed: Oct. 26, 2012

(65) Prior Publication Data

US 2013/0106339 A1  May 2, 2013

(30) Foreign Application Priority Data

Oct. 27, 2011 (KR) .................. 10-2011-0110753

(51) Int. Cl.
  H02P 6/12  (2006.01)
  H02P 21/14  (2006.01)
(52) U.S. Cl.
  CPC .................. *H02P 21/145* (2013.01)
  USPC ............... 318/400.15; 318/434; 318/400.01
(58) Field of Classification Search
  USPC ............ 318/400.15, 434, 400.01, 700, 799, 318/802, 809, 803, 811, 808
  See application file for complete search history.

(56) References Cited

U.S. PATENT DOCUMENTS 5,278,485 A * 1/1994 Kim ........................ 318/802
2009/0096395 A1 * 4/2009 Nakayama ............ 318/400.15

FOREIGN PATENT DOCUMENTS

| CN | 1229762 | 9/1999 |
|---|---|---|
| CN | 101227166 | 7/2008 |
| CN | 101237213 | 8/2008 |
| JP | 5-297080 | 11/1993 |
| JP | 11-332299 | 11/1999 |
| JP | 2000-333500 | 11/2000 |
| JP | 2001-352800 | 12/2001 |

OTHER PUBLICATIONS

Japan Patent Office Application Serial No. 2012-230771, Office Action dated Dec. 10, 2013, 2 pages.
The State Intellectual Property Office of the People's Republic of China Application Serial No. 201210418353.4, Office Action dated Sep. 3, 2014, 7 pages.

* cited by examiner

*Primary Examiner* — Karen Masih
(74) *Attorney, Agent, or Firm* — Lee, Hong, Degerman, Kang & Waimey

(57) ABSTRACT

An apparatus for estimating rotor time constant of induction motor, the apparatus being such that d-axis and q-axis current commands are received to output q-axis voltage command, to output q-axis voltage estimate, to output a changed value of rotor time constant, which is a difference between the q-axis voltage command and the q-axis voltage estimate, and to add the changed value of the rotor time constant to a rotor time constant, whereby the changed rotor time constant is outputted.

9 Claims, 9 Drawing Sheets

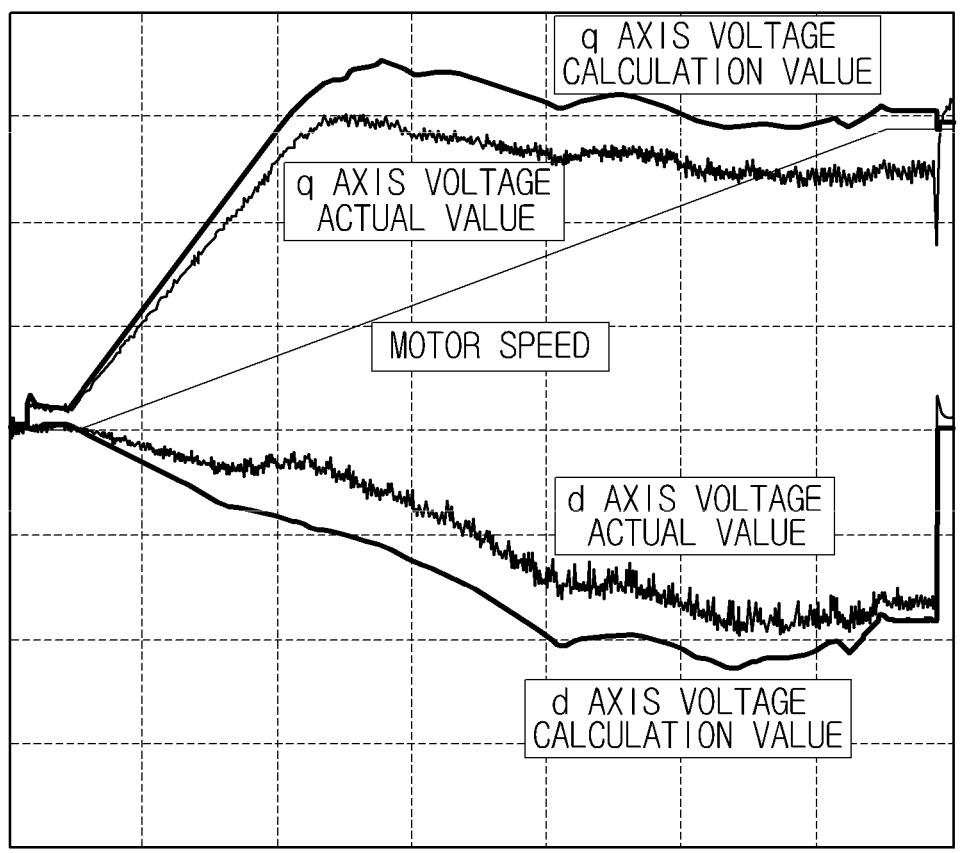

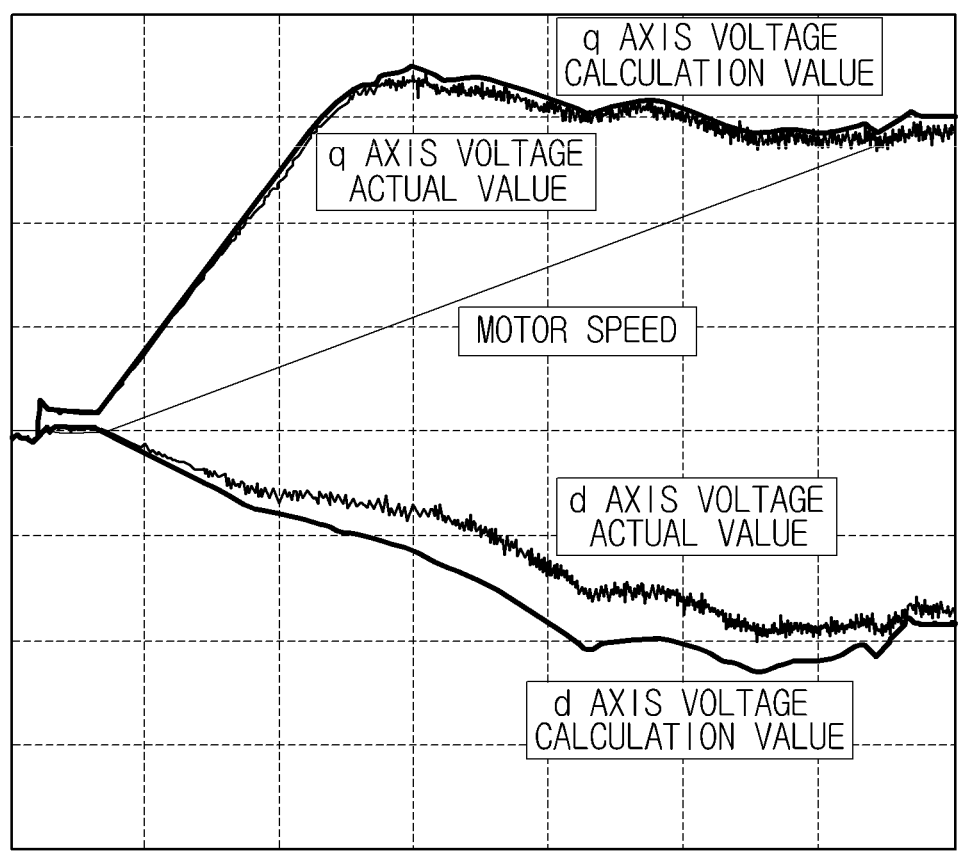

APPARATUS FOR ESTIMATING ROTOR TIME CONSTANT OF INDUCTION MOTOR

CROSS-REFERENCE TO RELATED APPLICATIONS

Pursuant to 35 U.S.C.§119 (a), this application claims the benefit of earlier filing date and right of priority to Korean Patent Application No. 10-2011-0110753, filed on Oct. 27, 2011, the contents of which are hereby incorporated by reference in their entirety.

BACKGROUND OF THE DISCLOSURE

1. Field of the Disclosure

The present disclosure relates to a technology of estimating rotor time constant of induction motor, and more particularly to an apparatus for estimating rotor time constant of induction motor.

2. Discussion of the Related Art

The information disclosed in this Discussion of the Related Art section is only for enhancement of understanding of the general background of the present disclosure and should not be taken as an acknowledgement or any form of suggestion that this information forms the prior art already known to a person skilled in the art.

In general, vehicles using a motor for a power source such as hybrid electric vehicles (HEVs) and electric vehicle (EVs) require a high level of precise torque control. Recently, an induction motor gains attention as a driving motor for HEVs and EVs as price of permanent magnet-type motor increases due to price increase of rare earth metals.

A technique of executing vector control on an alternating-current electric motor by using an inverter has been broadly used in an industrial field.

Direct vector control or indirect vector control is executed on induction motor, and an indirect vector control is generally performed that has less influence on parameter change of motor.

However, in an induction motor that performs indirect vector control, changes in rotor time constant caused by changes in external factors (particularly, temperature) have an influence on torque generation, and if changes in torque generation increase, problems occur where acceleration performance, riding quality and driving quality change due to external factors. In connection therewith, technology is disclosed in which rotor time constant is estimated in real time to minimize changes in torque generation.

FIG. 1 is a configurative view illustrating an apparatus for estimating rotor time constant of induction motor according to prior art.

In the system like above, a d-axis voltage obtained from rotor parameter may be $v_{ds}^e = R_s i_{ds}^{e*} - \omega_e \sigma L_s i_{qs}^{e*}$, and an output of a current controller (110) may be $v_{ds}^{e*}$.

Although these two values must be identical in ideal cases, a difference is generated between calculated slip speed and actual slip speed to make the output ($v_{ds}^{e*}$) of a current controller (110) different from the calculated d-axis output ($\hat{v}_{ds}^e$), if the rotor time constant ($\tau_r$) is changed by factors such as temperature and the like.

A derivative ($\Delta \tau_r$) of rotor time constant is obtained using the difference, and rotor time constant ($\hat{\tau}_r$) used for control is corrected by reflecting to an initial value ($\tau_{r0}$) of the rotor time constant.

As described above, the conventional apparatus for estimating rotor time constant of induction motor estimates the rotor time constant, and minimizes the derivative of torque generated thereby.

However, in a case the d-axis voltage is used as above, an actual voltage change resultant from change in rotor time constant ($\tau_r$) is small, which is due to size of a stator transient inductance ($\sigma L_s$) being small. Furthermore, as a q-axis current ($i_{qs}^{e*}$) is changed by torque command, size of d-axis voltage ($v_{ds}^e$) in light load is small to make it insufficient to compensate the changes in rotor time constant ($\tau_r$).

As noted from the foregoing, the system thus described is problematic in that the system can be applied only if a load reaches a predetermined level, such that a method is being attempted where the d-axis voltage ($v_{ds}^e$) is multiplied by speed or d-axis current ($i_{ds}^{e*}$).

However, despite the abovementioned attempt, the conventional system still has a problem in that changes in size of d-axis voltage ($v_{ds}^e$) during high speed operation are not large enough to detect the changes of the rotor time constant, such that it is not easy to apply the method to EV/HEV driving motor largely using the high speed operation.

SUMMARY OF THE DISCLOSURE

This section provides a general summary of the disclosure, and is not a comprehensive disclosure of its full scope or all of its features.

Exemplary aspects of the present disclosure are to substantially solve at least the above problems and/or disadvantages and to provide at least the advantages below. Accordingly, an aspect of the present disclosure provides an apparatus for estimating rotor time constant of induction motor configured to generate a predetermined level of torque at all times by being received with less influence of surrounding environment or operation conditions.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided an apparatus for estimating rotor time constant, the apparatus comprising: a current controller receiving d-axis current and q-axis current commands to output q-axis voltage command; an estimator receiving the d-axis current and q-axis current commands to output q-axis voltage estimate; a controller outputting a changed value of rotor time constant, which is a difference between the q-axis voltage command and the q-axis voltage estimate; and an adder adding the changed value of the rotor time constant to a rotor time constant to output a changed rotor time constant.

In some exemplary embodiments, the current controller performs a current control using the changed rotor time constant.

In some exemplary embodiments, the estimator uses a q-axis voltage equation to output q-axis voltage estimate.

In some exemplary embodiments, the controller outputs a changed value of the rotor time constant using a proportional integral control.

In some exemplary embodiments, the apparatus further comprises a first selector selecting the rotor time constant in response to temperature of the induction motor using a predetermined first reference table.

In some exemplary embodiments, the apparatus further comprises a second selector selecting the rotor time constant in response to the d-axis current of the induction motor using a predetermined second reference table.

In some exemplary embodiments, the apparatus further comprises: a third selector selecting the rotor time constant in response to temperature of the induction motor using a predetermined third reference table; and a fourth selector selecting the rotor time constant in response to the d-axis current of the induction motor using a predetermined fourth reference table.

In some exemplary embodiments, the first and third reference tables are prepared using changes in rotor time constant by rotor resistance change that changes in response to temperature of a stator of the induction motor.

In some exemplary embodiments, the second and fourth reference tables are prepared using changes in rotor time constant by inductance that changes in response to size of the d-axis current.

In some exemplary embodiments, the apparatus further comprises a combiner outputting a final rotor time constant by combining, at a speed less than a predetermined level, any one output of the first, second and fourth selectors with an output of the adder at a predetermined ratio.

In some exemplary embodiments, the combiner outputs the output of the adder at the final rotor time constant at a speed more than the predetermined level.

The apparatus for estimating rotor time constant of induction motor according to exemplary embodiments of the present disclosure has an advantageous effect in that similar acceleration performance and driving quality can be maintained in EV/HEV at all times by using a reference table at a slow speed section, and by performing temperature compensation at a full speed range section.

Other exemplary aspects, advantages, and salient features of the disclosure will become more apparent to persons of ordinary skill in the art from the following detailed description, which, taken in conjunction with the annexed drawings, discloses exemplary embodiments of the invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinafter by way of illustration only, and thus are not limitative of the present invention, and wherein:

FIGS. 7a and 7b are graphs illustrating measurement of changes in d-axis voltage and q-axis voltage after a maximum torque command is applied, in cases where stator temperatures of a motor are high and low respectively according to an exemplary embodiment of the present disclosure;

Figure 1:
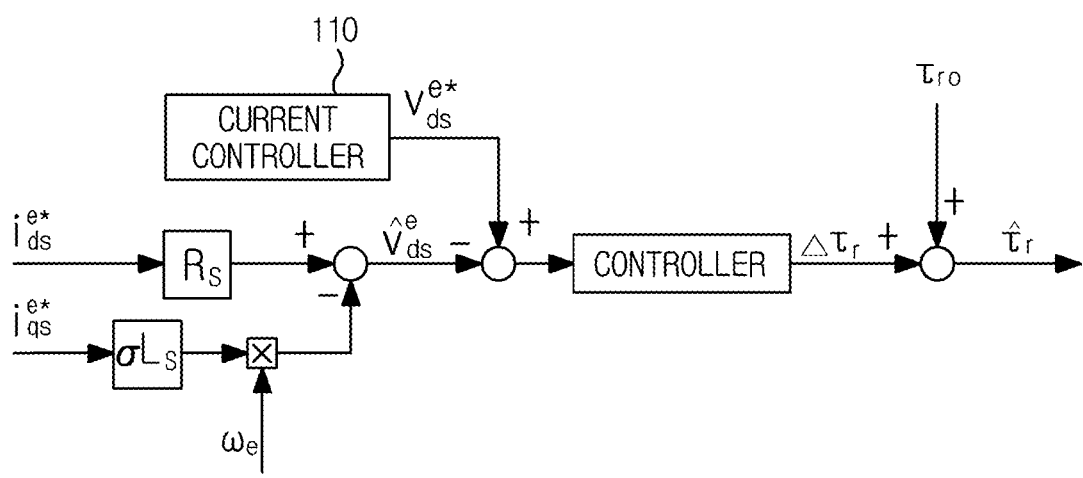
FIG. 1 is a configurative view illustrating an apparatus for estimating rotor time constant of induction motor according to prior art.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not he limited to the literal or commonly employed sense, but should be construed or may be different in accordance with the intention of a user or an operator and customary usages. Therefore, the definition of the specific terms or words should be based on the contents across the specification.

The suffixes 'module', 'unit' and 'part' may he used for elements in order to facilitate the disclosure. Significant meanings or roles may not be given to the suffixes themselves and it is understood that the 'module', 'unit' and 'part' may be used together or interchangeably. That is, the terms "-er", "-or", "part" and "module" described in the specification mean units for processing at least one function and operation and can be implemented by hardware components or software components, and combinations thereof.

As used herein, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

In case of controlling an induction motor using indirect vector control, if a rotor temperature changes, a rotor resistance ($R_r$) changes, which in turn changes rotor time constant, and slip change resultant therefrom affects torque generation. Industrial motors are generally used for devices controlling speed, and although torque control is relatively less important, influence of temperature must be taken into consideration for control of induction motor for EV/HEV where torque control is considered as being important.

Furthermore, in case of industrial motor driving, d-axis current is made constant at a speed lower than a rated speed, while d-axis current is reduced to be in reverse proportion to a speed at a speed higher than the rated speed. However, in case of MTPA (Maximum Torque Per Ampere) driving for increased efficiency, excitation inductance ($L_m$) changes, because current also changes in response to torque command, and rotor inductance ($L_r$) also changes, because $L_r = L_m + L_{lr}$, whereby rotor time constant also changes. Because these changes have non-linear characteristics, it is advantageous to use a reference table as in the present disclosure.

Now, exemplary embodiments of the present disclosure will be described in detail with reference to the accompanying drawings.

Figure 2:
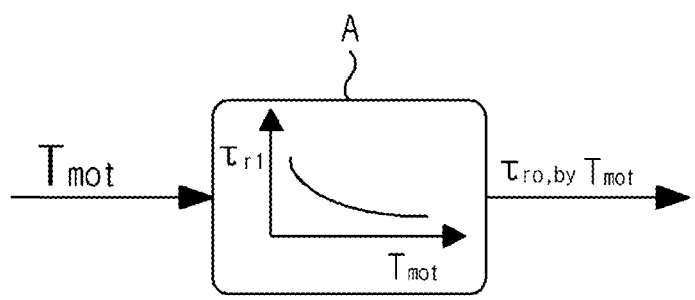
FIG. 2 is a schematic view illustrating estimation of rotor time constant in response to a rotor temperature according to an exemplary embodiment of the present disclosure.

FIG. 2 is a schematic view illustrating estimation of rotor time constant in response to a rotor temperature according to an exemplary embodiment of the present disclosure;

Referring to FIG. 2, estimation of rotor time constant according to the present disclosure is to estimate a rotor time constant ($\tau_{r1}$) in response to rotor temperature ($T_{mot}$). That is, after reading rotor temperature ($T_{mot}$), a rotor time constant ($\tau_{r1}$) appropriate to the rotor temperature is obtained using a reference table A.

In FIG. 2, the rotor temperature ($T_{mot}$) is received by input of reference table A.

Because rotor temperature is difficult to measure, a stator temperature of a motor relatively easy to measure is measured in the present disclosure.

The reference table A is prepared by using a rotor time constant that changes by rotor resistance change that changes in response to rotor temperature.

In a non-limiting example, reference table A of {300[ms], 270[ms], 250[ms], 240[ms]} can be made based on rotor temperatures of input {20[° C.], 40[° C.], 60[° C.], 80[° C.]}, and values not available on the table are used by linear interpolation of the above values.

Figure 3:
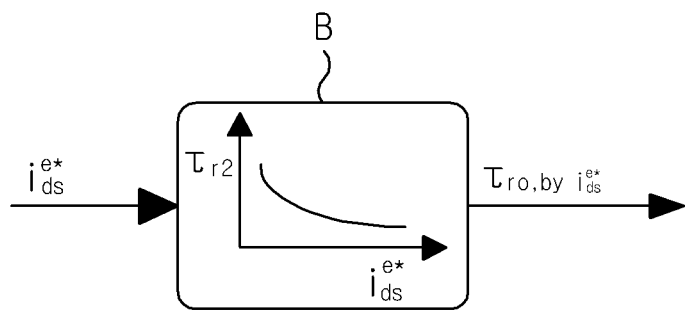
FIG. 3 is a schematic view illustrating estimation of rotor time constant in response to d-axis current of a rotor according to an exemplary embodiment of the present disclosure.

FIG. 3 is a schematic view illustrating estimation of rotor time constant in response to d-axis current of a rotor according to an exemplary embodiment of the present disclosure, where a method is explained for extracting a rotor time constant ($\tau_{r2}$) using inductance saturation phenomenon in response to changes in d-axis current ($i_{ds}^e$) of the motor.

The rotor time constant ($\tau_r$) is in proportion to rotor inductance ($L_r$), and the rotor inductance ($L_r$) is changed in size thereof by the saturation phenomenon, in a case size of d-axis current ($i_{ds}^e$) increases. That is, as the rotor time constant ($\tau_r$) is changed by d-axis current ($i_{ds}^e$), a reference table B may be used to obtain same.

In FIG. 3, the d-axis current ($i_{ds}^{e*}$) is used as an input of reference table B. The reference table B is prepared by using changes in rotor time constant based on inductance that changes in response to size of d-axis current ($i_{ds}^e$). In a non-limiting example, a reference table B of {240[ms], 200[ms], 170[ms], 150[ms]} is prepared based on size of d-axis current ($i_{ds}^e$) of input {30[A], 60[A], 90[A], 120[A]}, and values not available on the table are used by linear interpolation of the above values.

Figure 4:
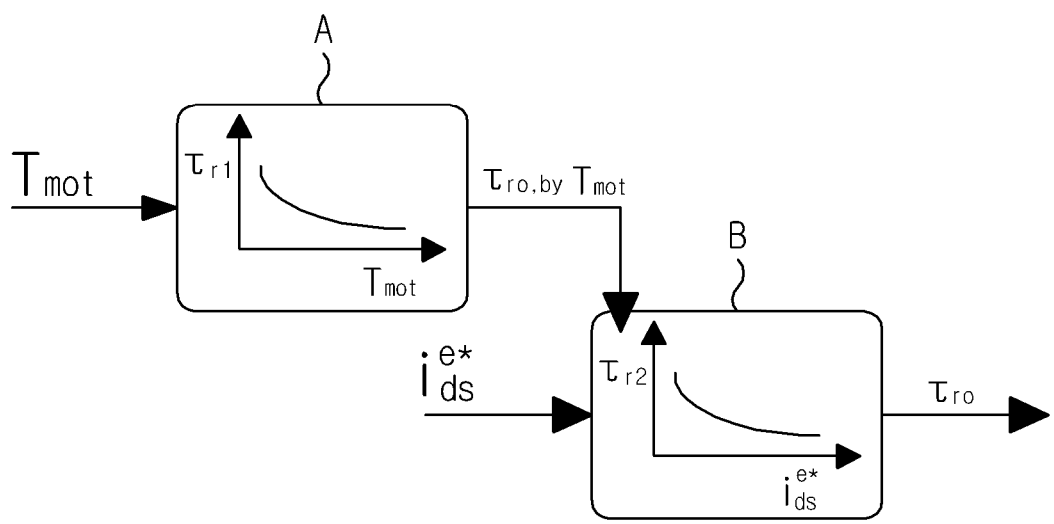
FIG. 4 is a schematic view illustrating estimation of rotor time constant in response to rotor temperature and d-axis current of a rotor according to an exemplary embodiment of the present disclosure.

FIG. 4 is a schematic view illustrating estimation of rotor time constant in response to rotor temperature and d-axis current of a rotor according to an exemplary embodiment of the present disclosure, where reference tables A and B are used to estimate the rotor time constant.

In the estimation of rotor time constant according to the present disclosure as shown in FIG. 4, the rotor time constant ($\tau_{r1}$) obtained by using reference table A of FIG. 2 is reflected on the reference table B of FIG. 3. Using this type of method, a rotor time constant ($\tau_{r0}$) finally reflected by rotor temperature ($T_{mot}$) and the size of d-axis current ($i_{ds}^e$) can be obtained.

At this time, if {120[%], 100[%], 85[%], 75[%]} of reference table B of FIG. 3 are made using percentage, a value of 100% is obtained using reference table A of FIG. 2, the estimation of the present disclosure can be also simply realized using the reference tables A and B.

Figure 5:
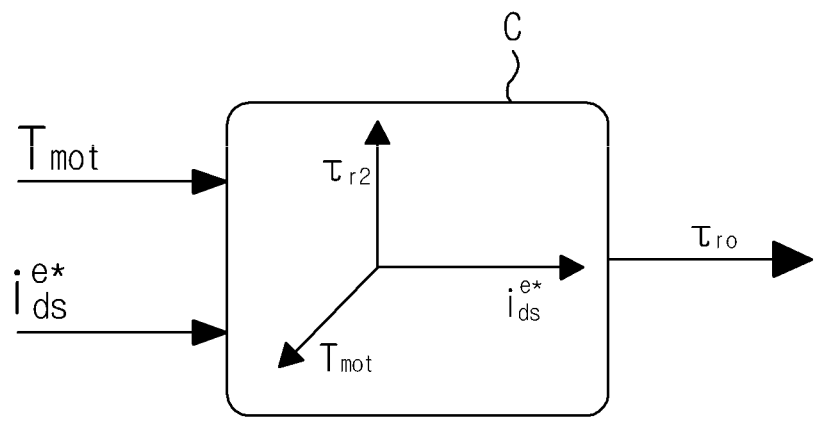
FIG. 5 is a schematic view illustrating a reference table of FIG. 4 realized in second dimension.

FIG. 5 is a schematic view illustrating a reference table of FIG. 4 realized in second dimension, where the rotor time constant can be estimated in the same method as that in FIG. 4.

Figure 6:
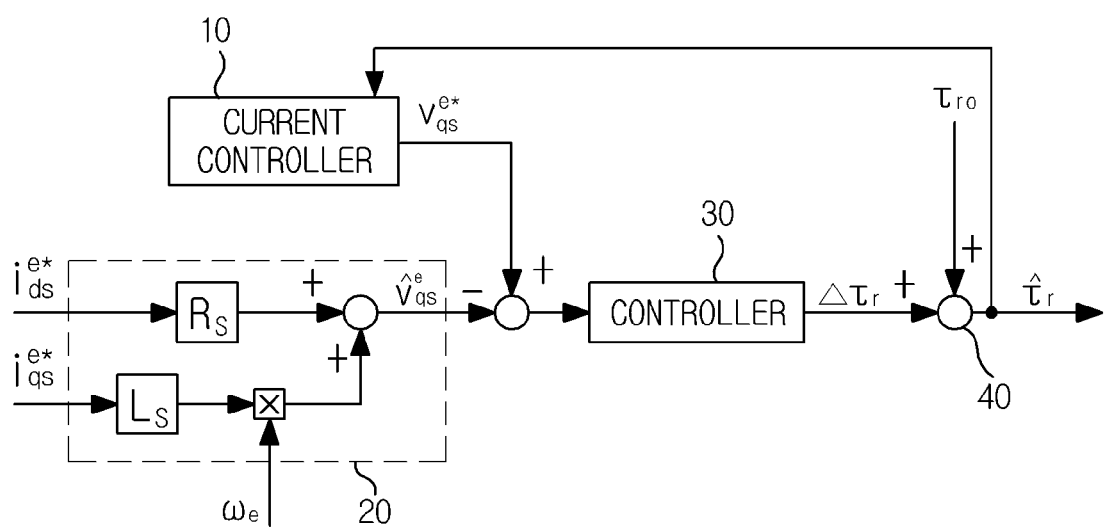
FIG. 6 is a configurative view illustrating an apparatus for estimating rotor time constant according to a first exemplary embodiment of the present disclosure.

FIG. 6 is a configurative view illustrating an apparatus for estimating rotor time constant according to a first exemplary embodiment of the present disclosure;

Unlike the conventional estimating apparatus using the d-axis voltage, the apparatus for estimating the rotor time constant in FIG. 6 is such that q-axis voltage ($v_{qs}^e$) is used to compensate the rotor time constant ($\tau_r$) to obtain a compensated rotor time constant ($\hat{\tau}_r$).

Referring to FIG. 6, the apparatus for estimating rotor time constant includes a current controller (10), a q-axis voltage estimator (20), a controller (30) and an adder (40).

The current controller (10) uses d-axis current command ($i_{ds}^e$) and q-axis current command ($i_{qs}^e$) to obtain q-axis voltage command ($v_{qs}^e$). It should be apparent to the skilled in the art that the method of obtaining voltage command using the current controller (10) is well known, such that no more detailed explanation thereto will be provided.

The q-axis voltage estimator (20) receives the d-axis current command ($i_{ds}^e$) and q-axis current command ($i_{qs}^e$), and uses q-axis voltage equation ($v_{qs}^e = R_s i_{qs}^e - \omega_e \sigma L_s i_{ds}^e$) to obtain q-axis voltage estimate ($\hat{v}_{qs}^e$).

The controller (30) obtains a difference between q-axis voltage estimate ($\hat{v}_{qs}^e$) and q-axis voltage command ($v_{qs}^e$).

The q-axis voltage estimate ($\hat{v}_{qs}^{e}$) is a value using a rotor parameter relative to a particular temperature, and although the q-axis voltage estimate ($\hat{v}_{qs}^{e}$) has nothing to do with a rotor temperature, the q-axis voltage command ($v_{qs}^{e*}$) is changed by temperature due to the rotor parameter that changes to the temperature. A predetermined torque can be obtained by minimizing the difference between the two values.

In order to minimize the difference between the two values, the controller (30) according to the present disclosure may be, for example, a PIC (Proportional Integral Controller).

An input of the controller (30) is a difference between q-axis voltage estimate and q-axis voltage command, and an output of the controller (30) is a derivative ($\Delta\tau$) of the rotor time constant.

The adder (40) is such that the rotor time constant ($\tau_{r0}$) is added by the output of the controller (30), which is a derivative ($\Delta\tau$) of the rotor time constant to output a changed rotor time constant ($\hat{\tau}_{r}$).

As noted from the foregoing, if the rotor time constant ($\hat{\tau}_{r}$) changed by the apparatus for estimating the rotor time constant is outputted, and a current control is performed by the current controller (10) in response to the changed rotor time constant, q-axis voltage command ($v_{qs}^{e*}$) can be changed.

Thus, the controller (30) changes the rotor time constant until the changed q-axis voltage command is equal to the q-axis voltage estimate, whereby a predetermined torque can be obtained.

It can be noted from the first exemplary embodiment of the present disclosure that, unlike the conventional system estimating rotor time constant using d-axis voltage, a stator inductance ($L_s$) having a value greater than that of a transient inductance ($\sigma L_s$) is used to make a voltage difference in response to temperature significant.

Furthermore, in view of the q-axis voltage equation of ($v_{qs}^{e}=R_s i_{qs}^{e}-\omega_e \sigma L_s i_{ds}^{e}$), more influence is received from d-axis current ($i_{ds}^{e}$), and the d-axis current maintains a predetermined level even if load becomes lesser, such that the apparatus according to the present disclosure is less influenced by load.

FIGS. 7a and 7b are graphs illustrating measurement of changes in d-axis voltage and q-axis voltage after a maximum torque command is applied, in cases where stator temperatures of a motor are respectively high and low according to an exemplary embodiment of the present disclosure.

Referring to FIGS, it can be noted that changes in d-axis and q-axis voltages are insignificant at low speed, and a voltage difference in response to temperature is greater at q-axis voltage at high speed, which means that changes in rotor time constant has a greater influence on the q-axis voltage output, and use of the q-axis voltage is more advantageous in temperature compensation of the rotor time constant.

Figure 8A:
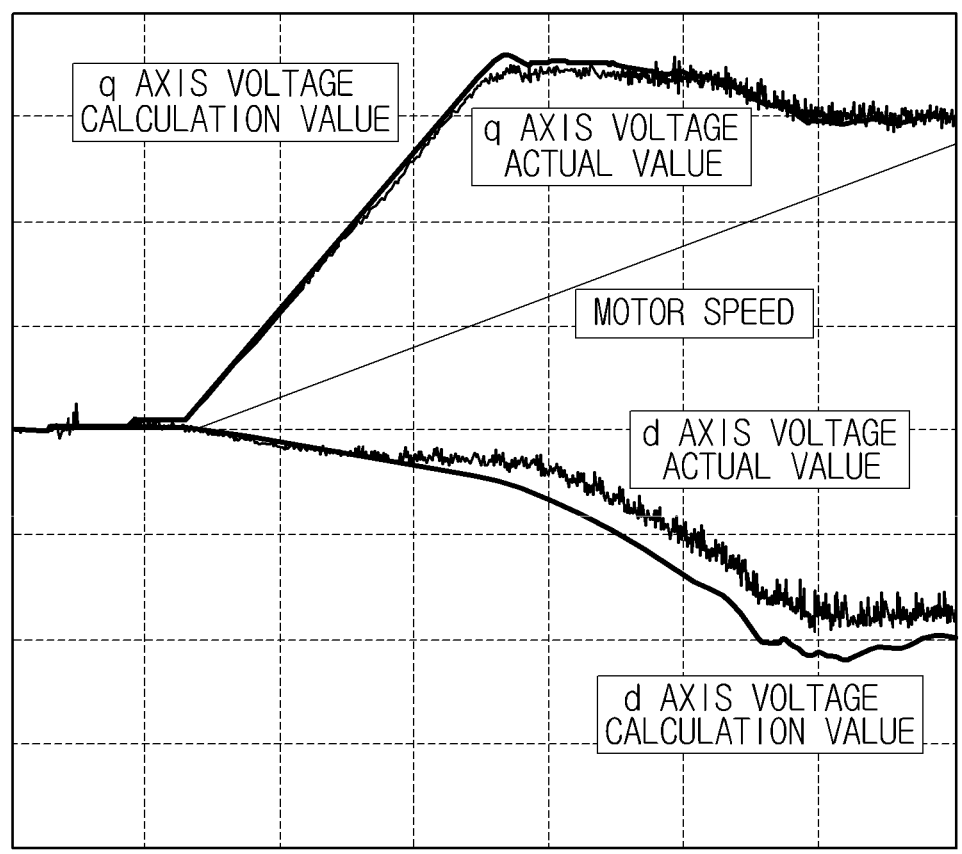
FIGS. 8a and 8b are graphs illustrating measurement of changes in d-axis voltage and q-axis voltage after a low torque command and a high torque command are respectively applied, in a case where stator temperature of a motor is high according to an exemplary embodiment of the present disclosure.
Figure 8B:
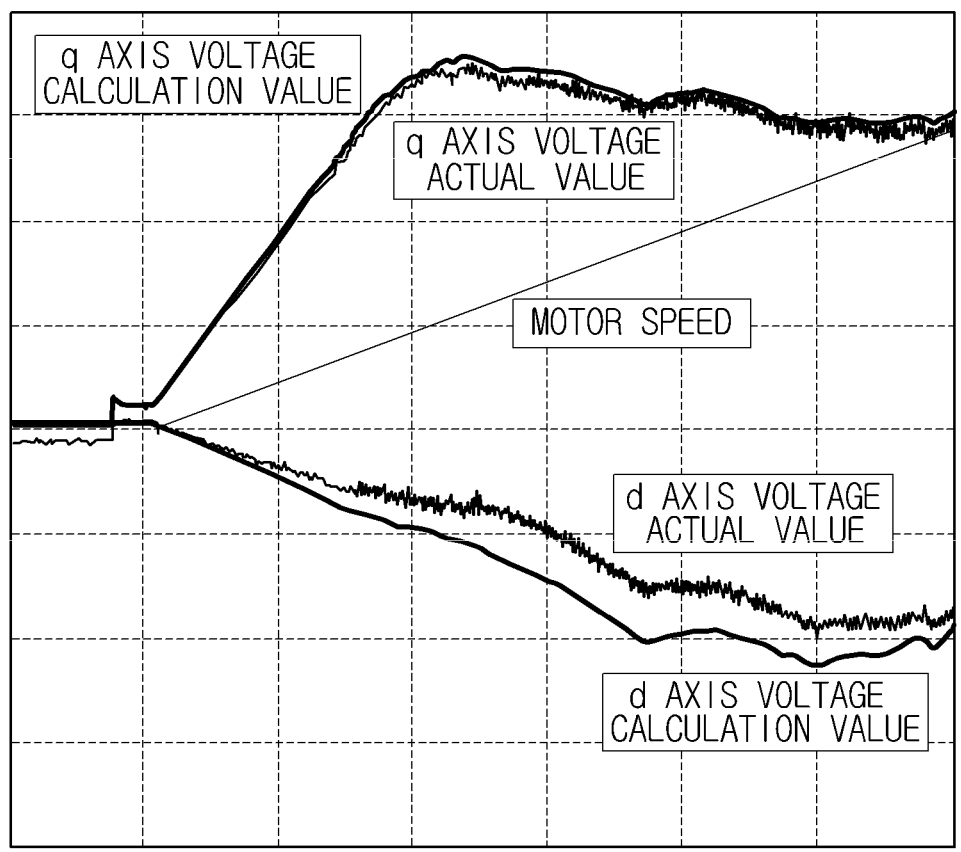

FIGS. 8a and 8b are graphs illustrating measurement of changes in d-axis voltage and q-axis voltage after a low torque command and a high torque command are respectively applied, in a case where stator temperature of a motor is high according to an exemplary embodiment of the present disclosure.

Referring to FIGS. 8a and 8b, even if there is a change in load, q-axis voltage maintains a relative constant level, such that, unlike the conventional method of using the d-axis voltage, it is possible to use the apparatus according to the present disclosure in all load ranges. Furthermore, accuracy is enhanced as speed goes faster because voltage is used in the estimating apparatus according to the present disclosure.

Figure 9:
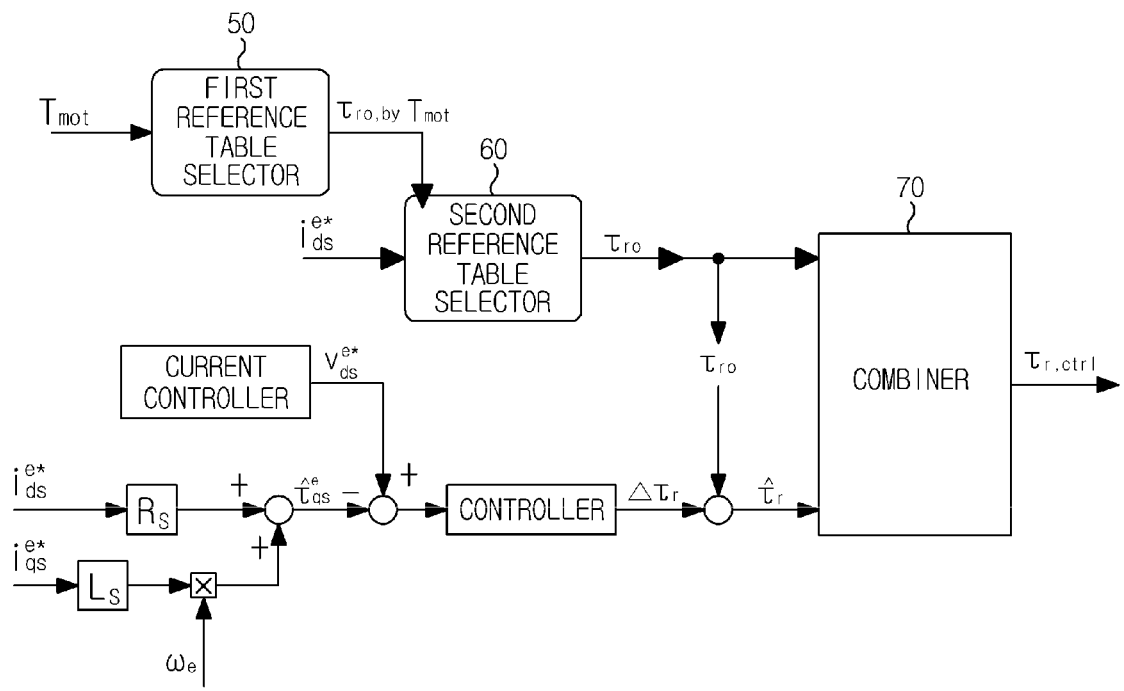
FIG. 9 is a schematic view illustrating an apparatus for estimating rotor time constant of an induction motor according to a second exemplary embodiment of the present disclosure.

FIG. 9 is a schematic view illustrating an apparatus for estimating rotor time constant of an induction motor according to a second exemplary embodiment of the present disclosure, where the apparatus for estimating rotor time constant of FIG. 6 is coupled with estimation of rotor time constant of FIGS. 2 to 4. Thus, although FIG. 9 has exemplified the method of FIG. 4, it should be apparent to the skilled in the art that the present disclosure is not limited thereto.

Referring to FIG. 9, the apparatus for estimating rotor time constant includes a current controller (10), a q-axis voltage estimator (20), a controller (30), an adder (40), a first reference table selector (50), a second reference table selector (60), and a combiner (70).

Operations of the current controller (10), the q-axis voltage estimator (20), the controller (30), and the adder (40) have been already provided with reference to FIG. 6, there will be no more elaboration thereto hereunder.

The first reference table selector (50) selects a rotor time constant using the reference table A based on rotor temperature as in FIG. 2, and the second reference table selector (60) selects a rotor time constant using the reference table B based on d-axis current of motor as in FIG. 3, where the rotor time constant outputted by the second reference table selector (60) is inputted to the adder (40).

The combiner (70) combines an output ($\tau_{r0}$) of the second reference table selector (60) and an output ($\hat{\tau}_{r}$) of the adder (40) at a predetermined ratio to output a final rotor time constant ($\tau_{r,ctrl}$) to be used for control. The combining type used by the combiner (70) may be changeable based on characteristics of a motor.

Figure 10:
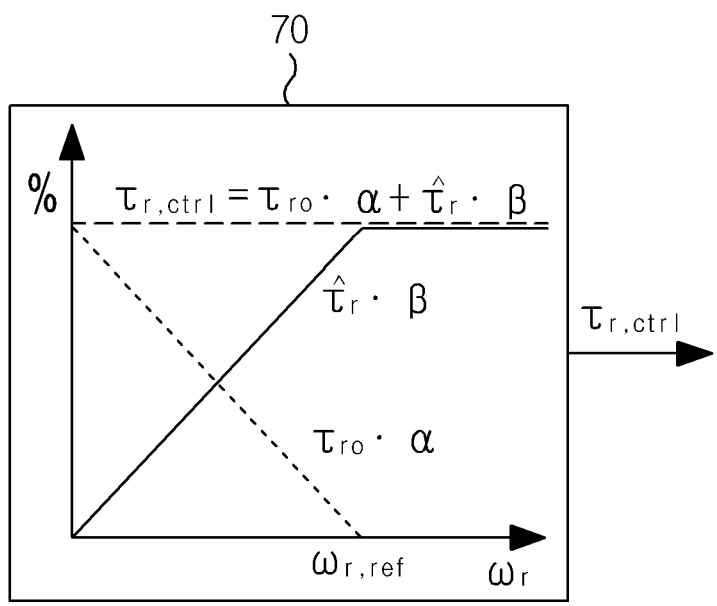
FIG. 10 is a schematic view illustrating a method performing a combination by a combiner of FIG. 9.

FIG. 10 is a schematic view illustrating a method performing a combination by the combiner of FIG. 9.

Referring to FIG. 9, the combiner (70) according to the present disclosure illustrates a method in which a linear combination is made at a speed slower than a particular speed ($\omega_{r,ref}$), and an output of the adder (40) at a speed greater than the particular speed ($\omega_{r,ref}$) is regarded as a final output. However, the present disclosure is not limited thereto.

Using the above method, it is possible to control a torque error relative to actual rotor temperature within 5%. The following table shows a torque difference before and after compensation, in a case speeds are respectively changed at a lower temperature (30° C.) and a higher temperature (80° C.), where unit of each torque error is %.

TABLE 1

| | | | | | | | | | | | | |
|---|---|---|---|---|---|---|---|---|---|---|---|---|
| about 30° C. | Before compensation | −0.90 | −0.90 | −0.37 | −2.10 | −8.06 | −7.80 | −9.68 | −10.7 | −10.7 | −11.0 | −14.2 | −12.2 |
| | After compensation | −0.06 | 0.18 | 0.15 | 0.59 | 1.36 | 1.64 | 1.03 | 0.19 | 0.26 | −2.10 | 0.38 | 1.32 |
| about 80° C. | Before compensation | −0.18 | 0.72 | 0.44 | 0.50 | −2.20 | −3.65 | −2.79 | −3.08 | −4.19 | −4.79 | −6.15 | −5.70 |
| | After compensation | 0.48 | 0.36 | 0.95 | 0.75 | 0.21 | 1.01 | 0.15 | 0.19 | 0.26 | 0.60 | 0.38 | 1.75 |
| | | Lower speed | | | | | | | | | | | Higher speed |

As apparent from the table, the torque error is much smaller than that before the compensation.

Figure 11:
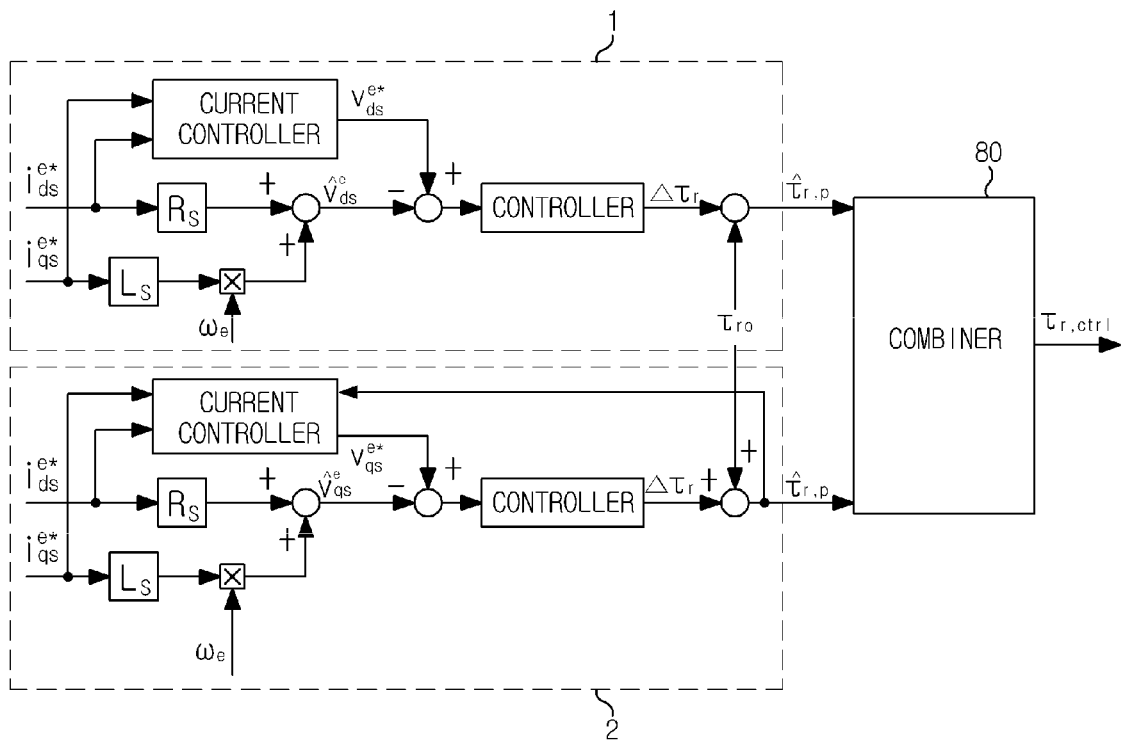
FIG. 11 is a schematic view illustrating an apparatus for estimating rotor time constant of an induction motor according to a third exemplary embodiment of the present disclosure.

FIG. 11 is a schematic view illustrating an apparatus for estimating rotor time constant of an induction motor according to a third exemplary embodiment of the present disclosure, where an estimator (1) using d-axis voltage and an estimator (2) using q-axis voltage are included.

The estimator (1) using d-axis voltage has the same configuration as that of estimating apparatus of FIG. 1, and the estimator (2) using q-axis voltage has the same configuration as that of estimating apparatus of FIG. 6.

The estimator (1) using d-axis voltage is largely efficient at a lower speed, and the estimator (2) using q-axis voltage is largely efficient at a higher speed, as explained before, such that it is possible to enhance the performance of temperature compensation by combining outputs of both estimators (1 and 2) by the combiner (80). Functions of constituent elements in FIG. 11 have been already provided, such that no further elaboration thereto will be given.

The estimation of rotor time constant according to prior art as an industrial technology lacked in consideration for operation of an induction motor for driving EV/HEV that operate at a speed range exceeding 2~3 times the rated speed. It is advantageous to use q-axis voltage over d-axis voltage for an induction motor that is largely used for high speed operation.

The present disclosure has an industrial applicability in that a reference table is used at a slow speed section to compensate the temperature for all speed range sections, whereby similar acceleration performance and driving quality can be maintained in EV/HEV at all times.

The above-mentioned apparatus for estimating rotor time constant of induction motor according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. An apparatus for controlling an induction motor, the apparatus comprising:
 a first selector configured to select a rotor time constant in response to a temperature of the induction motor using a predetermined first reference table;
 a current controller configured to receive d-axis and q-axis current commands to output a q-axis voltage command;
 an estimator configured to receive the d-axis and q-axis current commands to output a q-axis voltage estimate;
 a proportional integral controller configured to receive a difference between the q-axis voltage command and the q-axis voltage estimate to output a variation of the rotor time constant; and
 an adder configured to add the rotor time constant and the variation to output a changed rotor time constant.

2. The apparatus of claim 1, wherein the current controller is further configured to perform a current control using the changed rotor time constant.

3. The apparatus of claim 1, wherein the estimator is further configured to use a q-axis voltage equation to output the q-axis voltage estimate.

4. The apparatus of claim 1, wherein the controller is further configured to output the variation of the rotor time constant using a proportional integral control.

5. The apparatus of claim 1, further comprising a second selector configured to select the rotor time constant in response to a d-axis current of the induction motor using a predetermined second reference table.

6. The apparatus of claim 1, wherein the first reference table is prepared using changes in the rotor time constant by rotor resistance change, wherein the rotor resistance changes in response to a temperature of a stator of the induction motor.

7. The apparatus of claim 5, wherein the second reference table is prepared using changes in the rotor time constant by inductance, wherein the inductance changes in response to a size of the d-axis current.

8. The apparatus of claim 5, further comprising a combiner configured to output a final rotor time constant by combining, at a speed less than a predetermined level, any one output of the first and second selectors with an output of the adder at a predetermined ratio.

9. The apparatus of claim 8, wherein the combiner is further configured to output the output of the adder at the final rotor time constant at a speed more than the predetermined level.

* * * * *